No. 708,856. Patented Sept. 9, 1902.
W. E. BEE.
BELT TIGHTENER.
(Application filed Apr. 25, 1902.)

(No Model.) 2 Sheets—Sheet 1.

WITNESSES:
W. H. Cotton

INVENTOR.
William E. Bee.
BY
ATTORNEY.

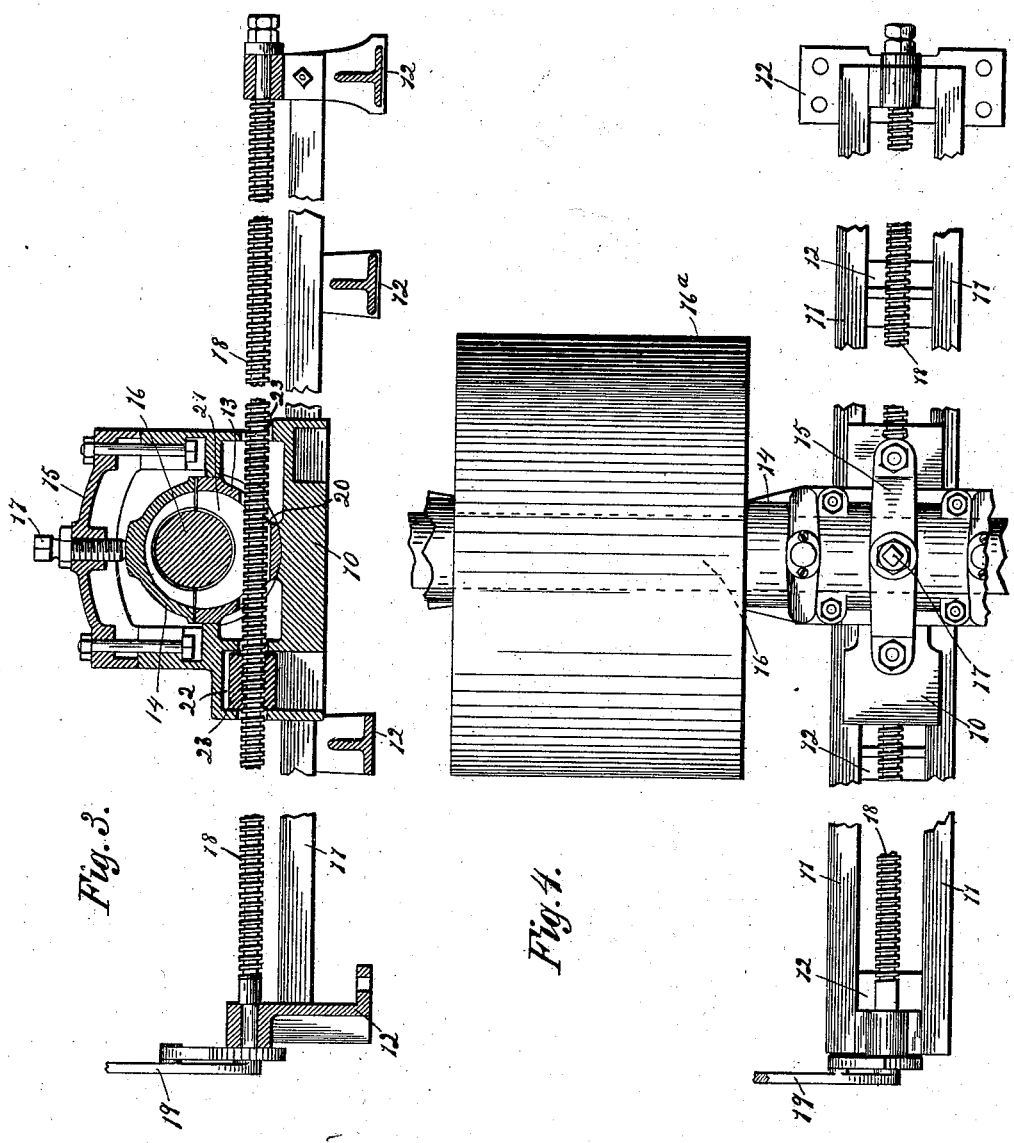

UNITED STATES PATENT OFFICE.

WILLIAM E. BEE, OF AURORA, ILLINOIS, ASSIGNOR TO THE FIRM OF STEPHENS, ADAMSON & CO., CONSISTING OF WILEY W. STEPHENS, FREDERICK G. ADAMSON, AND WILLIAM E. BEE, OF AURORA, ILLINOIS.

BELT-TIGHTENER.

SPECIFICATION forming part of Letters Patent No. 708,856, dated September 9, 1902.

Application filed April 25, 1902. Serial No. 104,661. (No model.)

*To all whom it may concern:*

Be it known that I, WILLIAM E. BEE, a citizen of the United States, and a resident of Aurora, county of Kane, and State of Illinois, have invented certain new and useful Improvements in Belt-Tighteners, of which the following is a specification, and which are illustrated in the accompanying drawings, forming a part thereof.

This invention relates to improvements in belt-tighteners of that type employing a pulley fixed to a shaft mounted in bearings carried by movable supports traveling on guide-bars and adjusted by means of threaded rods passing through the base of the supports.

Belt-tighteners of the character referred to as heretofore made are objectionable owing to the fact that the pulley-shaft is located at such distance from the point of attachment of the bearing on the guide-bars that the tension on the pulley due to the strain of the belt causes the slides to bind on the guide-bars, whereby difficulty is encountered in adjusting the bearings when it is desired to take up slack in the belt.

The object of the present invention is to overcome this difficulty, and it is accomplished by decreasing the distance between the guide-bars and the pulley-shaft, thereby bringing the line of strain in close proximity to the center of support and throwing it on the screw-adjusting rod, so that the leverage of the bearing on the guides is reduced to a minimum.

Other objects and advantages of the invention will hereinafter appear in the following description, and the novel features thereof will be particularly pointed out in the appended claims.

The invention consists of the arrangement and combination of parts illustrated in the accompanying drawings, in which—

Figure 2:
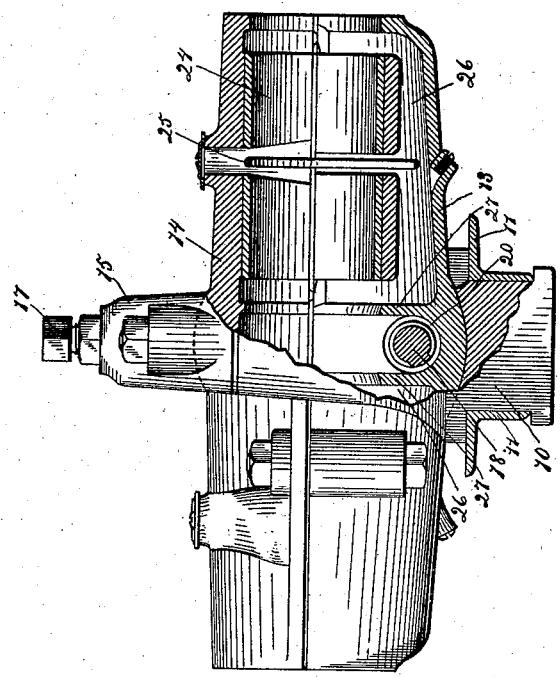
Figure 1:
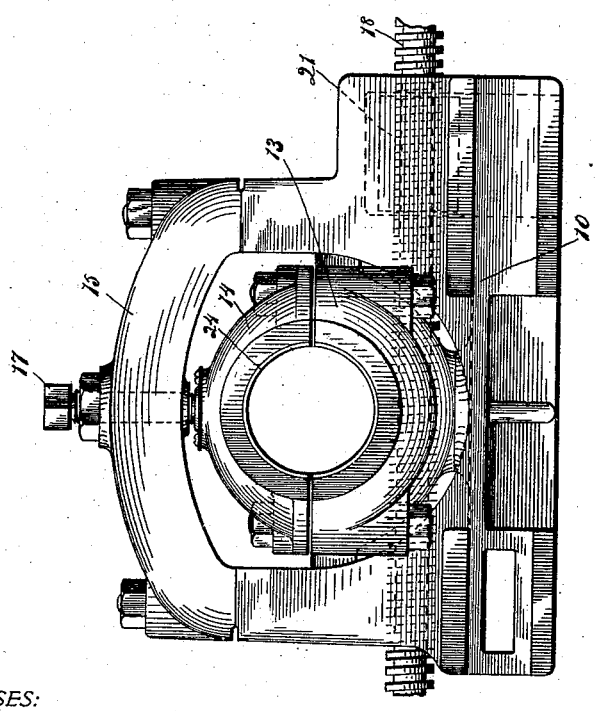

Figure 1 is an end elevation of the adjustable bearing employed with the belt-tightener and constructed in accordance with my invention. Fig. 2 is a side elevation of the same, partly in section, to show the arrangement of the interior of the bearing. Fig. 3 is a vertical transverse section of the bearing, on a reduced scale, and shown in connection with the guide-rails or bars; and Fig. 4 is a top plan view of the belt-pulley and one of the bearings.

10 indicates the journal-box saddle, the base of which is provided at opposite sides with longitudinal grooves to receive the usual guide-bars or rails 11, the latter being mounted upon supports 12. Seated in the saddle 10 is the journal-box, comprising a lower section 13 and upper section 14, the two sections being housed within the saddle by a cap 15, bolted to the saddle and clamped together by a threaded nut 17, passing through the cap and bearing on the upper section 14 of the journal-box. In the construction illustrated the base of the saddle is provided with a socket to receive a rounded boss on the bottom of the lower section 13 of the journal-box, this construction being provided to permit of adjustment or movement of the journal-box. This feature is not material, however, and the journal-box may be made adjustable, as shown, or not, as desired. The bearing is adjusted on the rails 11 through the medium of a threaded rod 18, journaled in the end supports 12, so as to be capable of rotation, but held against longitudinal movement, a ratchet device 19 or other suitable means being provided to impart the necessary motion to the rod 18.

The parts heretofore described are common to devices of this character; but as ordinarily constructed the screw-rod for adjusting the bearing is located below the journal-box and passes through the base of the saddle or other support of the same, so that considerable space is interposed between the line of strain on the belt-pulley shaft and the guide-rails, this arrangement resulting in a tendency o the saddle to tilt and bind on the guide-rails. I have obviated this difficulty by bringing the pulley-shaft, screw-rod, and guide-bars close together, and by the construction herein set forth have provided a stronger and more simple and compact device than any heretofore employed.

Referring particularly to Figs. 2 and 3, the lower section 13 of the journal-box is provided with apertures 20 in the opposite sides of the same and located in a line immediately below the belt-pulley shaft 16. The screw-threaded adjusting-rod 18 passes through these apertures 20 and also engages the saddle or may screw through a block 21, seated in a square recess 22 in the base of the saddle 10, so as to be held against turning when the rod 18 is rotated. The base of the saddle is also provided with apertures 23, alined with the apertures 20 in the journal-box section 13, through which the rod 18 extends. In each end of the journal-box is a bearing 24 to receive the belt-pulley shaft 16, to which the pulley 16ª is keyed, and any suitable means, such as the rings 25, may be provided for supplying a lubricant to the bearing from the oil-wells 26, located below the same in the journal-box. These oil-wells are secured by casting a wall 27, as shown in Fig. 2, in the lower journal-box section 13 at each side of the threaded rod 18 and which prevents the oil flowing out through the apertures provided for the screw-rod.

The invention is susceptible of various modifications without departing from the spirit thereof, and I wish it understood that the exact arrangement and character of the details, such as the bearing and the lubricating device, are immaterial and may be changed as desired.

I claim as my invention—

1. In a belt-tightener, in combination, a guide-rail, a saddle in sliding engagement with the guide-rail and provided with apertures in the opposite sides thereof, a journal-box carried by the saddle and having an aperture alined with the apertures in the saddle, a belt-pulley shaft journaled in the box, and a screw-rod passing through the said apertures and engaging the saddle for sliding the saddle on the guide-rail.

2. In a belt-tightener, in combination, a pair of guide-rails, a saddle in sliding engagement with the guide-rails, a journal-box carried by the saddle, a bearing in each end of the journal-box, the said saddle and journal-box being provided with alined apertures between the bearings; a belt-pulley shaft journaled in the bearings, and a screw-rod passing through said apertures in close proximity to the shaft and engaging the saddle, for sliding the same on the guide-rails.

3. In a belt-tightener, in combination, a pair of guide-rails, a saddle in sliding engagement with the guide-rails, a journal-box carried by the saddle, a bearing in each end of the journal-box, a belt-pulley shaft journaled in the bearings, the said saddle and journal-box being provided with alined apertures between the bearings, a screw-rod passing through the said apertures, a block seated in a recess in the saddle and having a threaded aperture engaged by the screw-rod, a wall in the journal-box at each side of the screw-rod to provide an oil-well under each bearing, and means for supplying a lubricant from the wells to the bearings.

4. In a belt-tightener, in combination, a guide-rail, a saddle in sliding engagement with the guide-rail, a journal-box carried by the saddle, a belt-pulley shaft journaled in the box, and a screw-rod engaging the saddle and located parallel with the guide-rail between the latter and the shaft for sliding the saddle on the guide-rail.

5. In a belt-tightener, in combination, a guide-rail, a saddle in sliding engagement with the guide-rail, a journal-box carried by the saddle, a belt-pulley shaft journaled in the box, and a screw-rod engaging the saddle and passing through alined apertures in the saddle and the journal-box between the shaft and the guide-rail.

6. In a belt-tightener, in combination, a pair of guide-rails, a saddle having a cap and in sliding engagement with the guide-rails, a journal-box comprising an upper and a lower section carried by the saddle and adjustable therein, a screw passing through the saddle-cap for clamping the sections together, a bearing in each end of the journal-box, a belt-pulley shaft journaled in the bearings, and a screw-rod engaging the saddle and passing through alined apertures in the saddle and the journal-box in close proximity to the belt-pulley shaft.

WILLIAM E. BEE.

Witnesses:
W. W. STEPHENS,
ARTHUR B. SEIBOLD.